(12) United States Patent
Callahan

(10) Patent No.: US 7,465,173 B2
(45) Date of Patent: Dec. 16, 2008

(54) DE-SOLDERING TOOL

(75) Inventor: Mark E. Callahan, East Longmeadow, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/623,137

(22) Filed: Jan. 15, 2007

(65) Prior Publication Data

US 2008/0169337 A1 Jul. 17, 2008

(51) Int. Cl.
*H01R 12/00* (2006.01)

(52) U.S. Cl. .................................................. 439/83

(58) Field of Classification Search ............... 439/83; 228/19, 264, 55; 29/764
See application file for complete search history.

(56) References Cited

U.S. PATENT DOCUMENTS

| | | | |
|---|---|---|---|
| 4,136,444 A * | 1/1979 | Durney | 29/764 |
| 4,518,110 A * | 5/1985 | Breske et al. | 228/20.5 |
| 4,637,452 A * | 1/1987 | Kawakami | 164/420 |
| 4,637,542 A * | 1/1987 | Breske et al. | 228/180.1 |
| 4,896,019 A | 1/1990 | Hyun | |
| 5,147,081 A | 9/1992 | Kim | |
| 5,549,240 A * | 8/1996 | Urban | 228/264 |
| 6,012,624 A | 1/2000 | French et al. | |
| 6,229,124 B1 | 5/2001 | Trucco | |

* cited by examiner

*Primary Examiner*—Jean F Duverne
(74) *Attorney, Agent, or Firm*—Cantor Colburn LLP

(57) ABSTRACT

A de-soldering tool includes an upper heating device having an upper heating element for applying heat to an upper mating structure, the upper mating structure arranged in a pattern matching contacts in an electrical connecter soldered to a printed wiring board; a lower heating device having a lower heating element for applying heat to a lower mating structure, the lower mating structure arranged in a pattern matching the solder connections on the underside of the PWB; a controller applying power to the upper heating element and the lower heating element to liquefy solder on the contacts in the electrical connecter.

8 Claims, 5 Drawing Sheets

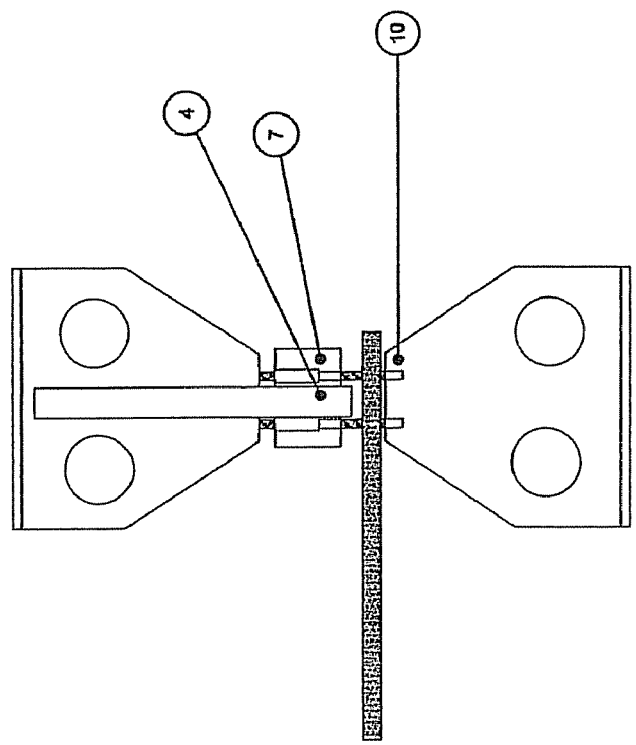
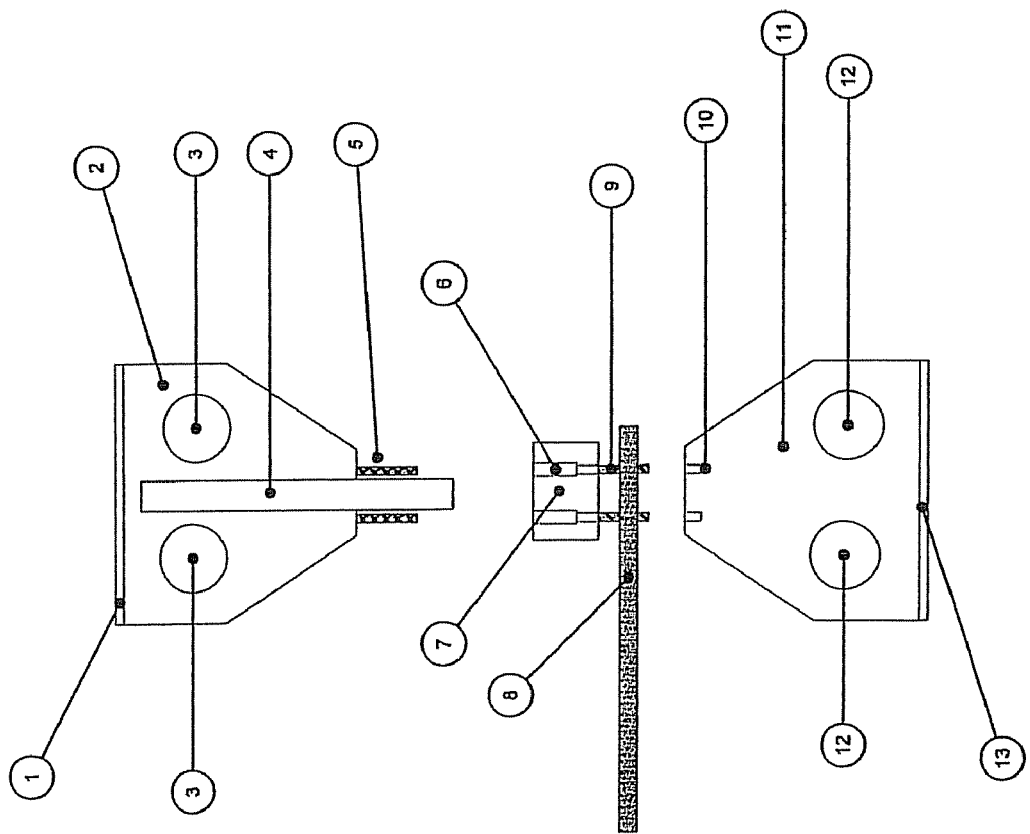
Figure 1b
Figure 1a

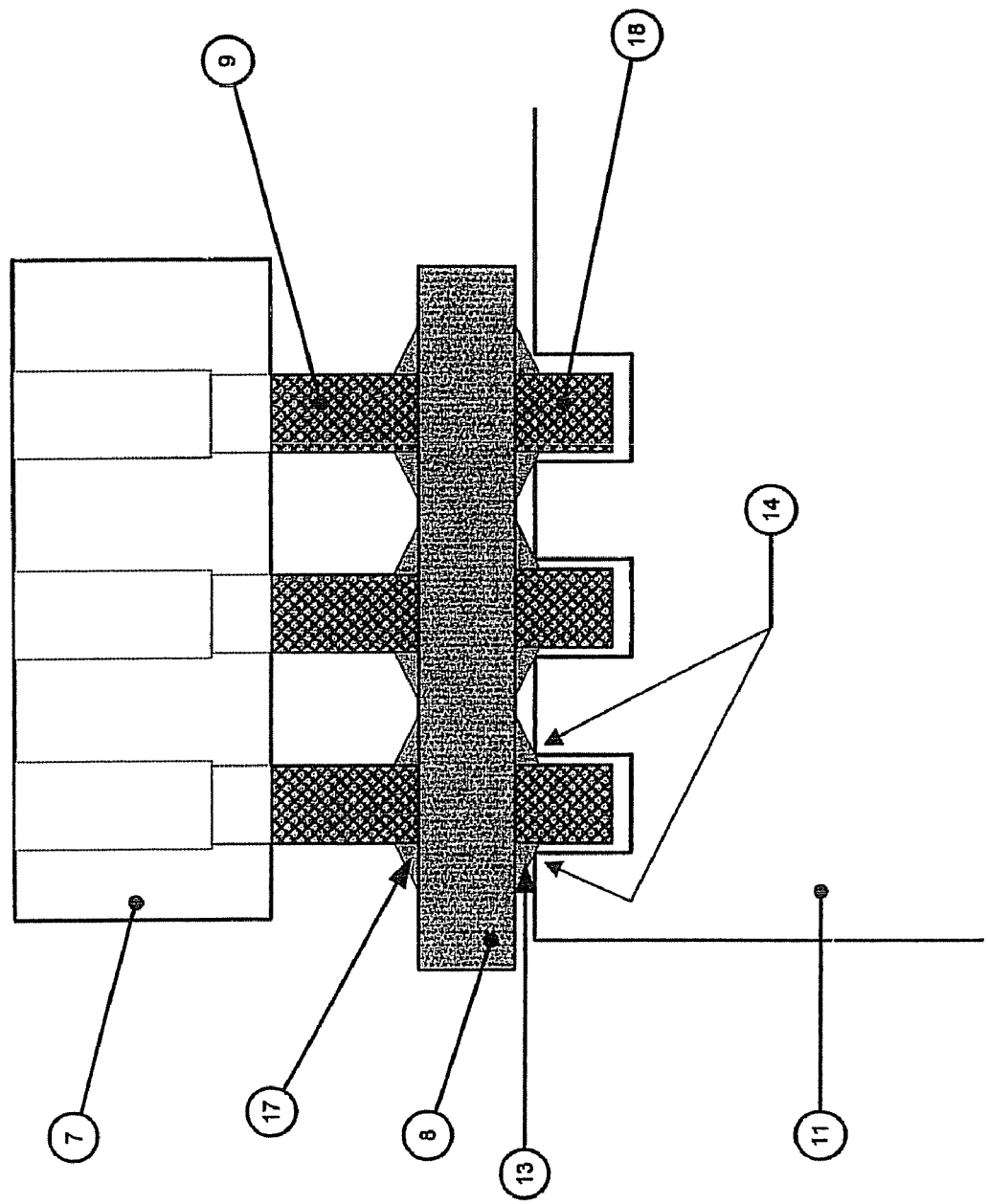

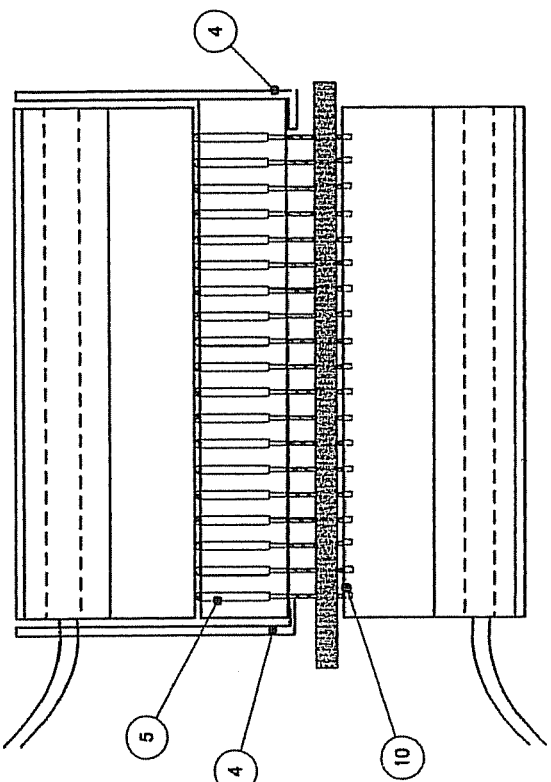
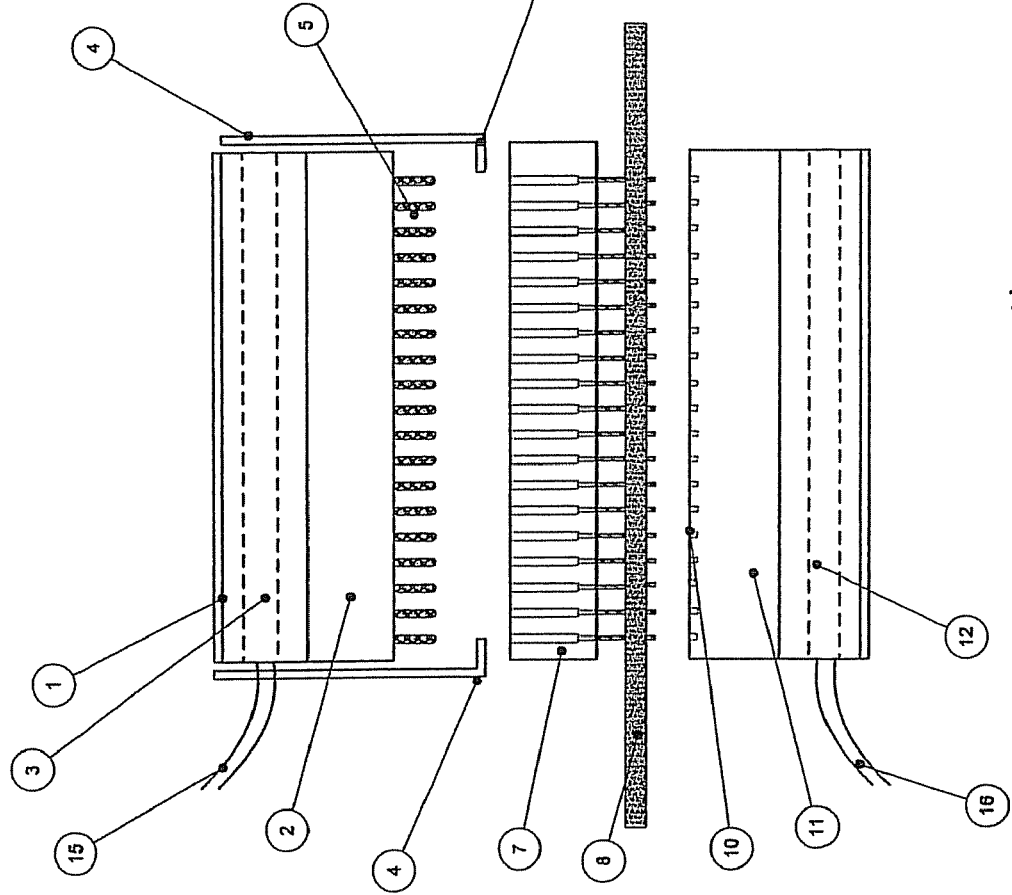
Figure 4A
Figure 4B

DE-SOLDERING TOOL

BACKGROUND OF THE INVENTION

Embodiments relate generally to de-soldering tools, and in particular to a de-soldering tool for removing components from thermally dissipative printed wire boards.

Thermally dissipative printed wire boards (PWBs) are often employed on electronic devices to rid the product of undesired thermal energy (heat) generated during operation. Occasionally, the manufacturing process of such a PWB mandates the removal of a multi-pin, plated-through-hole (PTH) connector, previously soldered in place. Removing a multi-pin connector from this type of PWB with present de-soldering techniques however, presents great difficulty due to the thermally dissipative nature of the PWB and the thermal energy required to melt solder.

Specifically, the mechanics of these difficulties are manifested by several challenges. One challenge is the generation of sufficient heat to return the solder to a liquid state in light of the thermally dissipative nature of the PWB. Typically, the heat required to bring a solder junction to the melting point of solder requires the tool ("soldering iron") to physically contact the junction for some time. This thermal rise time is greatly increased (if not halted entirely) by the thermally dissipative nature of the PWB.

Another challenge is the generation of sufficient heat to return the solder to a liquid state on the connector pins without causing undesired heating to other local components. Some de-soldering tools employ a directed flow of heated gas in an effort to establish the required heat on the connector pins. However, in some applications, there are much smaller surface mount technology (SMT) components located nearby that experience rapid heating, and by the force of the gas these components become dislodged, damaged or become removed altogether.

Another challenge is avoiding damage to other components on the PWB which possess much more restrictive thermal exposure specifications. Some de-soldering procedures employ a pre-heating cycle, which may damage other components or materials already soldered to the PCB. In some cases, these components do not have tolerance for the temperature ranges used in this pre-heating cycle. Examples of these materials or components may include capacitors, semiconductor devices, epoxies, adhesives, transformers, measurement probes, display components, tapes, labels, etc.

If the application of localized heating is excessive, the materials comprising the PWB may also incur damage. Thermal damage to the PWB is one criteria for rejection of manufactured boards under the IPC/EIA J-STD-001 manufacturing standards.

Uniform mechanical motion is needed along the entire length of larger connectors once the solder has entered a liquid state. Without applying a uniform lifting force simultaneously with the liquification of the solder, the connector's leads may generate a torque internal to the PWB during the extraction process potentially compromising the PWB structure.

Thus, there is a need in the art for a de-soldering tool that focuses thermal energy on solder connections and applies a uniform lifting force to remove components.

BRIEF SUMMARY OF THE INVENTION

The shortcomings of the prior art are overcome and additional advantages are provided through the provision of a de-soldering tool.

An embodiment of the invention is a de-soldering tool comprising: an upper heating device having an upper heating element for applying heat to an upper mating structure, the upper mating structure arranged in a pattern matching contacts in an electrical connecter soldered to a printed wiring board; a lower heating device having a lower heating element for applying heat to a lower mating structure, the lower mating structure arranged in a pattern matching the contacts in the electrical connecter; a controller applying power to the upper heating element and the lower heating element to liquefy solder on the leads of the electrical connecter.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A is a side view of an exemplary de-soldering tool in an open position;

FIG. 1B is a side view of the de-soldering tool of FIG. 1A in a closed position;

FIG. 3 is an enlarged view of a lower tool engaging a connector;

FIG. 4A is a front view of the de-soldering tool in an open position;

FIG. 4B is a front view of the de-soldering tool in a closed position; and

DETAILED DESCRIPTION

Figure 2:
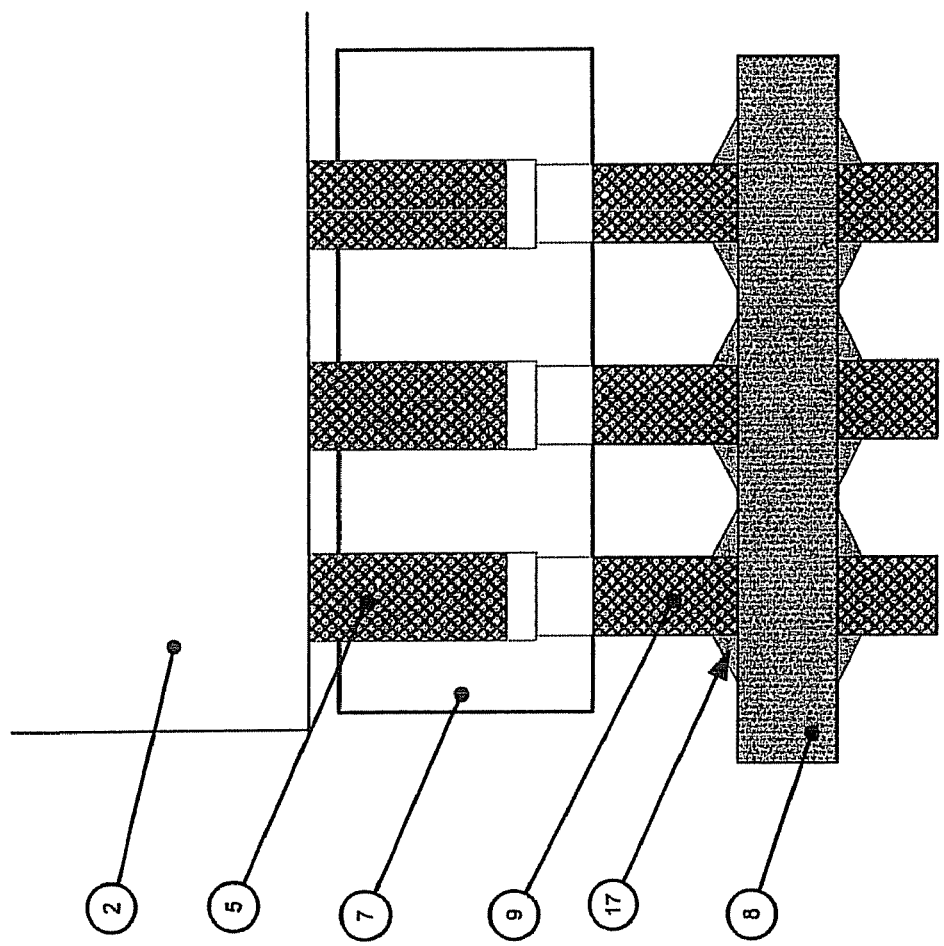
FIG. 2 is an enlarged view of an upper tool engaging a connector.

Embodiments of the invention include two heating devices to conduct thermal energy from the heating devices to the soldered pins of a multi-pin, plated-through-hole connector soldered to a thermally dissipative PWB. This is accomplished by a transfer of thermal energy via mechanical conduction through the electrical contacts of the connector directly to the solder junctions on the PWB. This heating action is further supplemented by a second heating device on the underside of the PWB, which accommodates the protruding connector leads, and males direct physical contact with the solder junctions. Prior to liquification of the solder, grasping clips on the upper heating device engage the connector body, and the connector may be easily extracted from the PWB when the solder is liquefied.

As described in further detail herein, the first heating device is created with a thermally conductive mating interface positioned above the connector. When the mating interface of this heating element is made to physically contact the electrical contact points of the connector, thermal energy is transitioned from the heating device to the solder junctions by direct thermal conduction. A second heating device is positioned on the opposite side of the PWB. This heating device is designed to physically interface with the solder junctions, and does so by means of pre-drilled holes that accommodate the protruding leads of the connector while allowing the heating element to directly contact the solder junction.

By the nature of thermal conduction and the inherent thermal mass of each heating device, these two heating devices generate sufficient thermal energy to melt the solder junctions, and distribute this thermal energy uniformly across the entire connector. This thermal energy is applied specifically to the soldered pins of the connector such that other components local to this connector will not experience damaging heat.

An additional feature of embodiments is two grasping clips that may be engaged onto the connector prior to energizing the heating elements. The purpose of these clips is to provide a lifting force at both ends of the connector simultaneously once the solder junctions have been returned to a liquid state. The principle benefit of these clips is the ability to apply a uniform lifting force along the axis of the connector. This feature eliminates the possibility of generating torque within the PWB when extracting the connector from the PWB.

FIG. 1A illustrates a side profile view of an exemplary de-soldering tool in an open (or pre-use) position. The de-soldering tool is used with a thermally dissipative PWB 8 having a plated-through-hole connector 7 soldered thereto. Connector leads 9 are soldered to plated through holes in PWB 8. In exemplary embodiments, the connector 7 may be a socket used to removably mount components such as CPUs. Internal (or external) to the connector 7 is a multitude of electrical contacts 6 that will ultimately conduct thermal energy to the solder junctions on leads 9.

The upper heating device 2 has a body composed of a relatively high thermal mass material, preferably metal. This upper heating device includes a mating structure 5 to physically contact the electrically conductive contacts 6 of the connector 7. In FIG. 1A, this mating structure 5 is indicated as pins, but alternatives include all types of receptacles (male, female, or "sexless") or other electrical conductor configurations as viable alternatives.

This upper heating device 2 is shown with multiple heating elements 3 which, by energizing combinations of these elements, the operator is provided with an ability to control the applied thermal energy in a step fashion. The capability to vary the applied heat in this fashion allows this tool to be employed on a variety of PWB designs with differing degrees of thermal dissipation.

The upper heating device 2 also includes two grasping clips 4 which engage the periphery of the body of connector 7 during operation, and provide a uniform lifting capability to extract the connector 7 from the PWB 8 when the solder has entered a liquid state. The grasping clips 4 may be hingedly connected to the upper heating device so as to rotate between an open position and a closed position.

A lower heating device 11 is also composed of a relatively high thermal mass material, again preferably metal. The lower heating device 11 includes a pre-drilled mating structure 10 to physically receive connector leads 9 of connector 7. The pre-drilled mating structure 10 of the lower heating device 11 are intended to accommodate the protruding leads 9 of the connector and allow the heating element to make physical contact directly with the solder junctions on the underside of the PWB. The lower heating device 11 also contains multiple heating elements 12 which provide for a stepped heating control similar to the upper heating device 2.

A controller 100 (FIG. 4C) associated with heating elements 3 and 12 provides control signals to generate various combinations of thermal energy that can be generated via independent step control of the upper and lower heating devices. Thermal insulators 1 and 13 provide a location to interface each heating device to the hardware-based controller 100.

The stepped control of the upper heating device and the lower heating device may be accomplished in a number of ways. For example, a first heating element may be powered prior to a second heating element being powered in the same heating device. Additionally, the upper and lower heating elements may be progressively powered in sequence to step the thermal energy. Any number of sequences may be used depending on the application and the thermal dissipative effects to the PWB.

FIG. 1B illustrates the tool in a closed (operational) configuration. Here, the mating interface of the upper heating device 2 has been mated with the connector 7, and, once the heating elements 3 are engaged, thermal energy migrates from the high thermal mass of the upper heating device 2 to the solder junctions by thermal conduction along these internal electrical contacts 6 of the connector 7 to leads 9.

The pre-drilled lower heating device 11 fits over the leads 9 extending through the underside of the PWB 8, and provides thermal energy directly to the solder junction. FIG. 1B also illustrates the grasping clips 4, which engage under the connector 7 to provide lift once the solder junction has been altered to a liquid state.

FIG. 2 shows a detailed illustration of how a portion of the mating interface of the upper heating device 2 physically contacts the electrical contacts 6 of the plated-through-hole connector 7. A portion of the thermally dissipative PWB 8 is shown. The connector leads 9 of the connector 7 are shown above the PWB 8 and protruding through to the opposite side of the PWB 8.

The mating structure 5 of the upper heating device 2 makes physical contact with the electrical contacts 6 of the connector 7. The mating structure 5 of the upper heating device 2 is accommodated by the electrical contacts 6 of the connector 7, and thermal energy is transferred directly to the solder junction 17 by thermal conduction. It is by this physical contact that thermal energy is applied directly to the solder junction from the connector side of the PWB 8.

FIG. 3 is an enlarged view illustrating how a portion the mating interface of the lower heating device 11 physically contacts the soldered connections 14 of the plated-through-hole connector 7 on the underside of the PWB 8. The through-hole leads 9 of the connector 7 protrude through the bottom of the PWB as indicated at lead end 18. Solder junctions above and below the PWB are shown at 17 and 13, respectively.

The point of physical contact 14 between the lower heating device 11 and solder connections 13 is located on the underside of the PWB 8. The protruding lead ends 18 are accommodated within the pre-drilled holes and do not make contact with the lower heating device 11, however, the lower heating device 11 is specifically machined so as to directly contact the solder junctions 13. It is by this physical contact thermal energy is applied directly to the solder junction 13 from the underside of the PWB 8 when the heating elements 12 are energized.

FIG. 4A is a front view of the de-soldering tool in an open state. In this view, the features identified in FIG. 1A are easily identifiable. FIG. 4A depicts the grasping clips 4 in a neutral state, prior to engaging the connector 7. Cable assemblies 15 and 16 provide power to heating elements 3 and 12, respectively. The cable assemblies 15 and 16 interface with controller 100 that applies power to the heating devices.

FIG. 4A depicts the start of the preferred operation cycle to remove connector 7. Here the PWB 8 with connector 7 is placed such that the upper and lower heating devices will mate with the connector. The upper heating device 2 is then lowered to mate with the connector 7, and the lower heating device 11 is raised to make contact with the underside of the PWB 8.

This completed mating operation is shown in FIG. 4B, where the grasping clips 4 are positioned to engage and lift the connector 7 once the solder is liquefied through the heating process. FIG. 4B illustrates an exemplary position for the introduction of thermal energy from both the upper and lower heating devices 2 and 11. The grasping clips 4 engage the connector 7, and the mating structure 5 of the upper heating device 2 makes direct physical contact with the electrical contacts 6 of the connector 7. The lower heating device 11 makes physical contact at the solder junctions 13 on the underside of the PWB at the lower mating interface 10. By a combination of thermal energy from both the upper and lower heating devices, the solder junctions are melted via thermal conduction along the mechanical path of the mating interface of both heating devices.

Figure 4C:
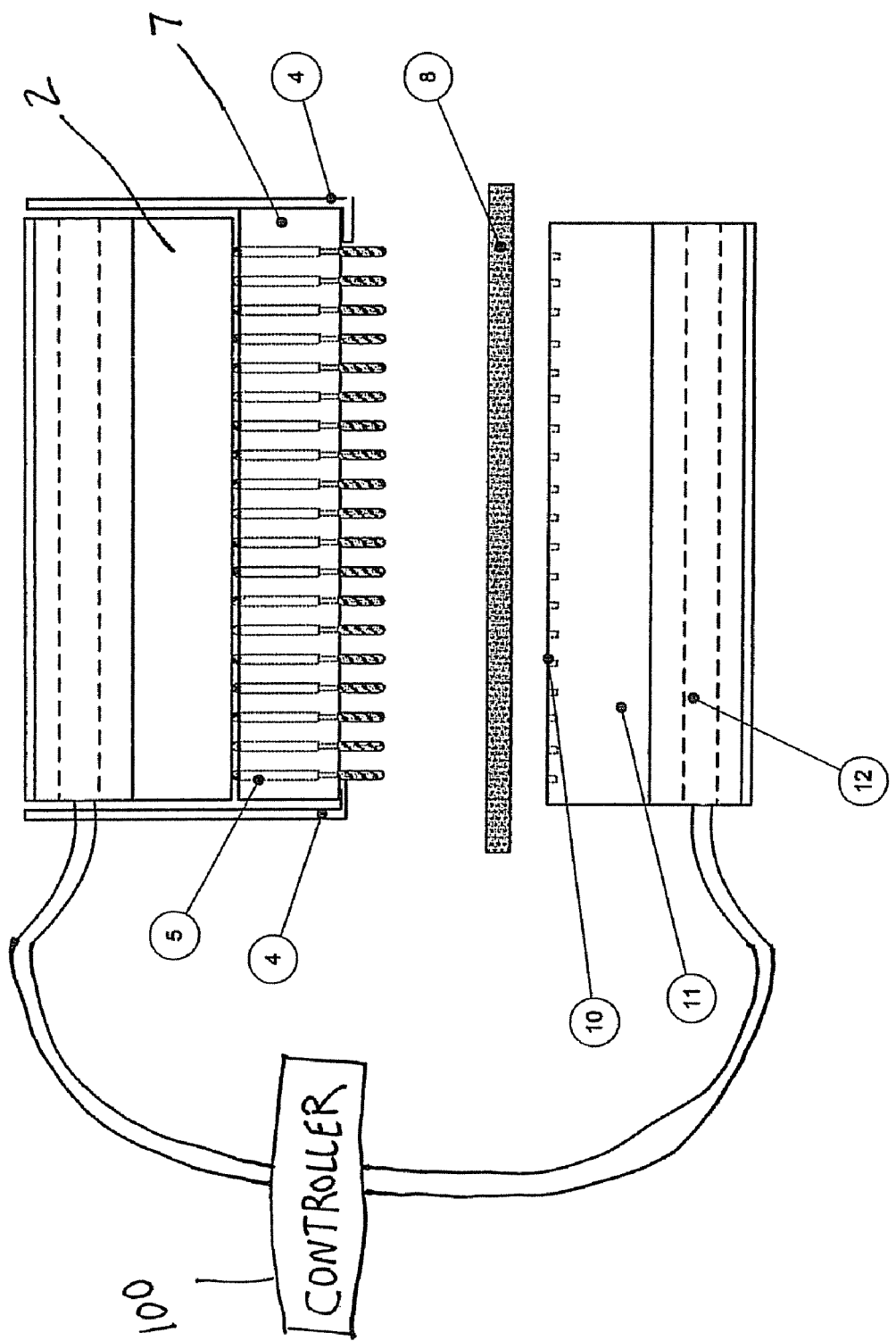
FIG. 4C is a front view of the de-soldering tool upon removal of the connector.

FIG. 4C illustrates the completion of the de-soldering operation using the de-soldering tool. It can be seen that the connector 7 has been extracted from the PWB 8 by the grasping clips 4, and the upper heating device 2 has been pulled from the proximity of the PWB 8. At this position, both heating devices may be de-energized allowing the connector 7 and each heating device to cool before handling.

The mating structure 5 of the upper heating device 2 has a pattern corresponding to the locations of the contacts 6 in connector 7. The mating structure 10 of the lower heating device 11 has a pattern corresponding to the locations of the leads 9 in connector 7. By making a modification to mating structures on the heating devices, it is possible for the de-soldering tool to be used with round, square, or rectangular connectors, and any other possible configuration commonly used in electronics manufacture.

The embodiments described above relate to de-soldering a horizontally mounted connector. By making an adaptation to the upper heating device and/or the lower heating device, it is possible to create alternate configurations such that the transfer of thermal energy may be horizontal or otherwise, while including grasping clips that pull vertically. By this modification, embodiments of the invention may be used for 45 degree, 90 degree, or other non-vertical electrically oriented connector arrangements.

In alternate embodiments, thermal probes are used to monitor temperature at the mating structures of the upper and lower heating devices. The thermal probes provide temperature signals to the controller 100 over cable assemblies 15 and 16. The controller 100 executes a feedback process to implement step functions for both heating devices and may be programmed for specific PWB designs. In such a way, a PWB rework station could be more automated and thus ensure the proper thermal energy were applied to the circuit.

In alternate embodiments, the heating devices may be operated in a manner that is the reverse of that described above, thus allowing the use of this de-soldering tool for installation of connectors in addition to extraction.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A de-soldering tool for de-soldering an integrated circuit socket from a thermally dissipative printed wiring board comprising:
an upper heating device having an upper heating element for applying heat to an upper mating structure, the upper mating structure arranged in a pattern matching contacts in the integrated circuit socket soldered to the thermally dissipative printed wiring board, the upper mating structure including a plurality of pins arranged to contact individual contacts in the integrated circuit socket;
a lower heating device having a lower heating element for applying heat to a lower mating structure, the lower mating structure arranged in a pattern matching leads in the integrated circuit socket, the lower mating structure including a plurality of holes arranged to receive individual leads in the integrated circuit socket;
a controller applying power to the upper heating element and the lower heating element to liquefy solder on the leads in the electrical connecter.

2. The de-soldering tool of claim 1 further comprising:
grasping clips on the upper heating device, the grasping clips positioned to engage a periphery of the electrical connector.

3. The de-soldering tool of claim 1 wherein:
the grasping clips are hingedly attached to the upper heating device.

4. The de-soldering tool of claim 1 wherein:
the upper heating element includes a plurality of heating elements.

5. The de-soldering tool of claim 1 wherein:
the lower heating element includes a plurality of heating elements.

6. The de-soldering tool of claim 1 further comprising:
a thermal probe for monitoring temperature at one of the upper mating structure and the lower mating structure, the thermal probe providing a temperature signal to the controller.

7. A method of de-soldering an integrated circuit socket soldered to a thermally dissipative printed wiring board, the method comprising:
obtaining an upper heating device having an upper heating element for applying heat to an upper mating structure, the upper mating structure arranged in a pattern matching contacts in the integrated circuit socket soldered to the thermally dissipative printed wiring board, the upper mating structure including a plurality of pins arranged to contact individual contacts in the integrated circuit socket;
placing the upper mating structure in contact with electrical contacts in the connector;
obtaining a lower heating device having a lower heating element for applying heat to a lower mating structure, the lower mating structure arranged in a pattern matching soldered leads of the integrated circuit socket, the lower mating structure including a plurality of holes arranged to receive individual leads in the integrated circuit socket;
placing the lower mating structure in contact with solder around the leads;
energizing the upper heating element; and
energizing the lower heating element.

8. The method of claim 7 further comprising:
securing grasping clips about the periphery of the connector; and
lifting the connector from the printed wiring board after energizing the upper heating element and the lower heating element.

* * * * *